US007009767B2

(12) United States Patent
Hoshikawa et al.

(10) Patent No.: US 7,009,767 B2
(45) Date of Patent: Mar. 7, 2006

(54) POLARIZATION SEPARATING/SYNTHESIZING ELEMENT AND OPTICAL DEVICE USING IT

(75) Inventors: Masaharu Hoshikawa, Minato-ku (JP); Hiromitsu Umezawa, Minato-ku (JP)

(73) Assignee: FDK Corporation, Tokyo (JP)

( * ) Notice: Subject to any disclaimer, the term of this patent is extended or adjusted under 35 U.S.C. 154(b) by 72 days.

(21) Appl. No.: 10/415,077

(22) PCT Filed: Oct. 3, 2001

(86) PCT No.: PCT/JP01/08695

§ 371 (c)(1),
(2), (4) Date: Apr. 25, 2003

(87) PCT Pub. No.: WO02/39151

PCT Pub. Date: May 16, 2002

(65) Prior Publication Data

US 2004/0032635 A1    Feb. 19, 2004

(30) Foreign Application Priority Data

Nov. 10, 2000    (JP)    ............................. 2000-344087

(51) Int. Cl.
G02B 27/28    (2006.01)
G02B 5/30    (2006.01)
(52) U.S. Cl. ...................... 359/484; 359/487; 359/496; 359/497; 385/11; 385/16
(58) Field of Classification Search ................ 359/484, 359/487, 496–497, 485, 500, 460, 454; 349/9; 353/20; 362/19; 385/11, 16
See application file for complete search history.

(56) References Cited

U.S. PATENT DOCUMENTS

| 4,641,926 | A | * | 2/1987 | Shirasaki | ..................... 359/487 |
| 5,212,594 | A | * | 5/1993 | Joynes | ...................... 359/494 |
| 5,748,369 | A | | 5/1998 | Yokota | |
| 6,449,089 | B1 | * | 9/2002 | Moshrefzadeh et al. | .... 359/454 |
| 6,798,938 | B1 | * | 9/2004 | Cao | ............................. 385/17 |
| 2003/0021519 | A1 | * | 1/2003 | Zalevsky et al. | ............. 385/16 |

FOREIGN PATENT DOCUMENTS

| GB | 2076994 | | * 12/1981 |
| JP | 10-31111 | | 2/1989 |
| JP | 02013922 | A | * 1/1990 |
| JP | 06324289 | A | * 11/1994 |

* cited by examiner

Primary Examiner—Leonidas Boutsikaris
(74) Attorney, Agent, or Firm—Wenderoth, Lind & Ponack, L.L.P.

(57) ABSTRACT

A polarized-light separating/combining element is obtained which can suppress deviation in a direction of rays (angular error), reduce beam coupling loss and improve extinction ratio. Size reduction and loss lowering is achieved for an optical device (optical circulator or optical switch), to enable manufacture at a low cost and with ease. A polarized-light separating/combining element has a transparent member having flat surfaces parallel with each other on which both parallel surfaces, polarized-light separating/combining films are formed respectively, wherein both polarized-light separating/combining films are faced to air. By using the polarized-light separating/combining element, various kinds of optical devices (optical circulators or optical switches) can be formed. Particularly, it is effective for realizing a low crosstalk characteristic in a matrix optical switch.

5 Claims, 7 Drawing Sheets

POLARIZATION SEPARATING/SYNTHESIZING ELEMENT AND OPTICAL DEVICE USING IT

TECHNICAL FIELD

The present invention relates to a polarized-light separating/combining element having polarized-light separating/combining films formed on parallel flat surfaces of a transparent member wherein the polarized-light separating/combining film is made as an interface to air, and to an optical device, such as an optical circulator or an optical switch, using the same. This technique is especially useful for a matrix optical switch for use in an optical communication system.

BACKGROUND OF THE INVENTION

In an optical communication system or the like, optical circulators and optical switches are used as optical devices for optical path control. The optical circulator is an optical device having a light separating function for outputting an input light from a certain port to only another particular port, e.g. outputting an input light from a first port $P_1$ to a second port $P_2$ and outputting an input light from a second port $P_2$ to a third port $P_3$, thereby forming a cyclic optical path. Meanwhile, an optical switch is an optical device having an optical-path switching function of outputting an input light from a first port $P_1$ to either of a third port $P_3$ or a fourth port $P_4$ and outputting an input light from a second port $P_2$ to either of a fourth port $P_4$ or a third port $P_3$.

The optical circulator uses a 45-degree Faraday rotator for applying a fixed magnetic field by a permanent magnet, to rotate a polarization plane by 45 degrees toward a predetermined direction thereby realizing the reciprocality of rays. The optical switch uses a variable Faraday rotator that changes an application magnetic field direction by an electromagnet, thereby realizing optical-path switching. However, the basic part can be structured nearly similarly.

Conventionally, various structures of optical circulators and optical switches have been developed. As one example of those, there is provided a structure wherein polarized-light separating/combining elements having polarized-light separating/combining films are arranged with spacing to insert optical rotators, made by a Faraday rotator and a ½-wavelength plate, therebetween. The conventional polarized-light separating/combining element, generally, is a polarizing beam splitter (PBS) in a structure having two glass-made triangular prisms bonded together through a sandwiched polarized-light separating/combining film (dielectric multi-layer film). There is also a polarized-light separating/combining element having two surfaces of polarized-light separating/combining films. In such a case, triangular prisms are bonded on the both ends of a prism having a parallelogram section through polarized-light separating/combining films (dielectric multi-layer films) into a rectangular structure.

In the conventional polarized-light separating/combining element, it is ideal to output light parallel with the input element. However, the output light actually has a slight angle with respect to the input light. Although the angular deviation results from dimensional and angular errors on each prism and prism bonding accuracy, there is a defect of beam coupling loss increase.

Meanwhile, the conventional polarized-light separating/combining element, because of its low extinction ratio of polarized light, has a problem that a crosstalk characteristic is poor when built in the optical device.

SUMMARY OF THE INVENTION

It is an object of the present invention to provide a polarized-light separating/combining element which can suppress the deviation in a direction of light rays (that is, angular error) to a possible extent and reduce beam optical loss.

It is another object of the invention to provide a polarized-light separating/combining element that can improve the extinction ratio.

It is still another object of the invention to provide an optical device (optical circulator or optical switch) small in size, low in loss and low in price by using such polarized-light separating/combining elements. Also, it is an object of the invention to provide a magneto-optical matrix optical switch small in size, low in loss and low in price.

The present invention provides a polarized-light separating/combining element, wherein a transparent member has flat surfaces parallel with each other, on which both parallel surfaces, polarized-light separating/combining films are respectively formed, the polarized-light separating/combining films being faced to air. Namely, in the polarized-light separating/combining element according to an embodiment of the present invention, the polarized-light separating/combining films are positioned at an interface of transparent material and air.

For suppressing the angular deviation of output light with respect to input light, it is extremely effective to reduce the parts and eliminate the bonding structure. The polarized-light separating/combining element has two surfaces of polarized-light separating/combining films of the present invention and is formed such that the polarized-light separating/combining films are formed on a transparent member (typically, glass) having parallel flat surfaces. The polarized-light separating/combining films are designed suitable for an interface of air—glass, wherein the polarized-light separating/combining films are coincident in the orientation concerning polarized light.

In the polarized-light separating/combining element, the polarized-light separating/combining films are set up in an oblique direction (at a proper angle, for example, of 45 degrees) on an optical path. Dielectric multi-layer films, for example, are used as the polarized-light separating/combining films.

Also, in a preferred embodiment of the invention, there is provided an optical circulator arranged with an optical rotator comprising a 45-degree Faraday element, a permanent magnet for applying a magnetic field to the 45-degree Faraday element, and ½-wavelength plate, between two polarized-light separating/combining elements, wherein the above-described polarized-light separating/combining elements are used for one or both of the two polarized-light separating/combining elements.

Furthermore, the invention provides an optical switch arranged with polarized-light separating/combining elements in front and rear of a variable optical rotator capable of switching an optical rotation angle to 0 degrees and 90 degrees, a 2×2 optical switch, wherein at least one of the polarized-light separating/combining elements uses the above-described polarized-light separating/combining element.

Herein, the variable optical rotator comprises, for example, a Faraday element, an electromagnet for applying a variable magnetic field to the Faraday element, and a ½-wavelength plate.

The 2×2 optical switch unit of the matrix optical switch uses the polarized-light separating/combining elements in front and rear of a variable optical rotator. A matrix optical switch can be structured by vertically and horizontally arranging the 2×2 optical switches in multi-stages. It is effective in respect of size-reduction to use a hollow coil in the electromagnet for applying a variable magnetic field to a Faraday element and accommodate the Faraday element within the same.

Particularly, in the case of a matrix optical switch, preferred is a structure that the polarized-light separating/combining element of a unitary structure has a polarized-light separating/combining film having a broad area, for allowing a plurality of collimated light beams to enter, formed on the transparent member, and variable optical rotators capable of switching an optical rotation angle to 0 degrees and 90 degrees are provided such that the valuable optical rotators are arranged on respective optical paths of collimated light beam between adjacent ones of the polarized-light separating/combining elements.

BEST MODE FOR CARRYING OUT THE INVENTION

Figures 1A, 1B:
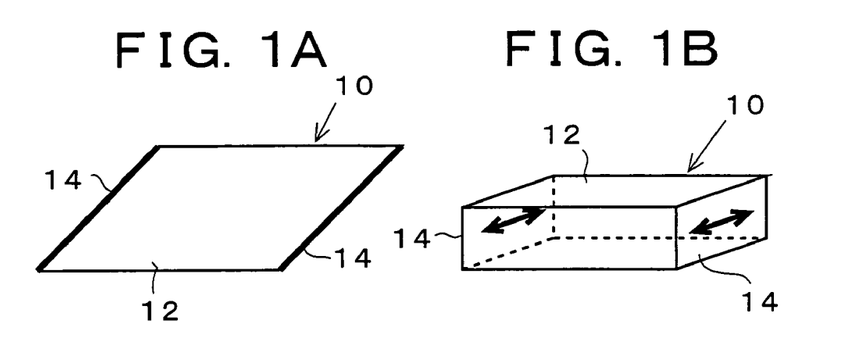
FIGS. 1A, 1B and IC are explanatory views of a polarization separating/combining element according to the present invention.
Figure 1C:
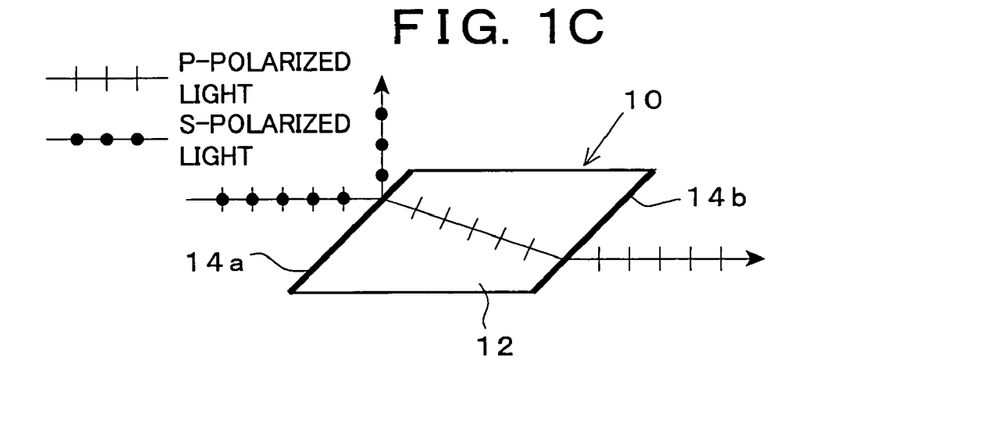

In FIGS. 1A–1C showing one embodiment of a polarized-light separating/combining element according to the present invention, the polarized-light separating/combining element 10 is in a structure that, as shown in FIG. 1A, polarized-light separating/combining films 14 are respectively formed on both mutually parallel surfaces (first and second surfaces) of a glass-made prism (transparent member) 12 having a parallelogram section. Namely, the polarized-light separating/combining films 14 are in a state facing the air. Herein, the polarized-light separating/combining film uses a dielectric multi-layer film designed to be suited for a glass-air interface. Meanwhile, the polarized-light separating/combining films 14 formed on the opposite two surfaces of the parallelogram prism 12 are coincident in respect of the orientation (shown by the arrow with arrowheads on its both ends) related to polarization (see FIG. 1B).

As illustrated in FIG. 1C, the polarized-light separating/combining element 10 is set up on an optical path in a direction in which both polarized-light separating/combining films 14 assume oblique 45 degree angles relative to a direction of light rays. The S-polarized light, of input light, reflects upon a first polarized-light separating/combining film 14a toward a direction offset by 90 degrees. The P-polarized light, of input light, transmits the first polarized-light separating/combining film 14a and refracts at a prism-entrance surface to transmit through a prism interior. The P-polarized light further refracts at a prism-exit surface to transmit a second polarized-light separating/combining film 14b, thus being outputted. Accordingly, the P-polarized light is extremely high in extinction ratio because it transmits both of the first and second, two-staged, polarized-light separating/combining films 14a, 14b.

On the opposite two surfaces of the glass-made parallelogram prism 12, polarized-light separating/combining films 14 are formed by dielectric multi-layer films that are optimally designed for 45-degree incidence of air on one side and glass on the other side. The dielectric multi-layer film is similar to the usual PBS (polarizing beam splitter) except that it is a film for air on one side. Meanwhile, the surfaces other than the surfaces on which the polarized-light separating/combining films 12 are made are formed with an anti-reflection film having a reflectivity of 0.1% in order to expel as much as possible of the in-prism stray light out of the prism. The obtained polarized-light separating/combining film obtains an extinction ratio characteristic of −60 dB or less for transmission components and −20 dB or less for reflection components. The transmission light has the main component of P-polarized light while the reflection light has the main component of S-polarized light.

Incidentally, as can be seen from FIG. 1C, in the invention, because the optical path refracts due to a difference of refractive index between air and glass, beam shift takes place between an incident position and an exit position. In this connection, in the conventional structure, the polarized-light separating/combining film at both surfaces is contacted with the glass having equal refractive index. Because input light is vertically incident on a surface of one triangular prism while output light vertically exits at a surface of the other triangular prism, no beam shift occurs on principle between input light and output light.

However, for an optical device, the magnitude of deviation in light-ray direction between input light and output light (angular error) is important rather than a presence or absence of beam shift. In the conventional structure, dimensional errors on individual prisms are integrated, hence increasing the total light-ray angular deviation. On the contrary, the present invention satisfactorily using one prism or one parallelogram plate can suppress low the angular deviation in a direction of rays. This has a great effect particularly for the case in which polarization-light separating/combining elements are arranged in multiple stages as in the matrix, optical switch. The matrix optical switch, because of the large collimator-to-collimator distance, requires an increase of the beam diameter of collimated light.

On the other hand, as a collimated light characteristic, as the beam diameter increases, the coupling loss increases relative to beam angular deviation. Meanwhile, the matrix optical switch has a multiplicity of inputs and outputs, wherein it is insufficient to have a well coupling state only of a combination of a particular input port and a particular output port, i.e., when the port is changed over, a characteristic such as insertion loss must be free from deteriorating (for the combinations of every input and every output passage). Accordingly, the capability of basically suppressing beam angular deviation to be small, as in the polarized-light separating/combining element of the invention, can give rise to a merit capable of conspicuously reducing the coupling loss and moreover facilitating an assembling adjustment.

Figure 2:
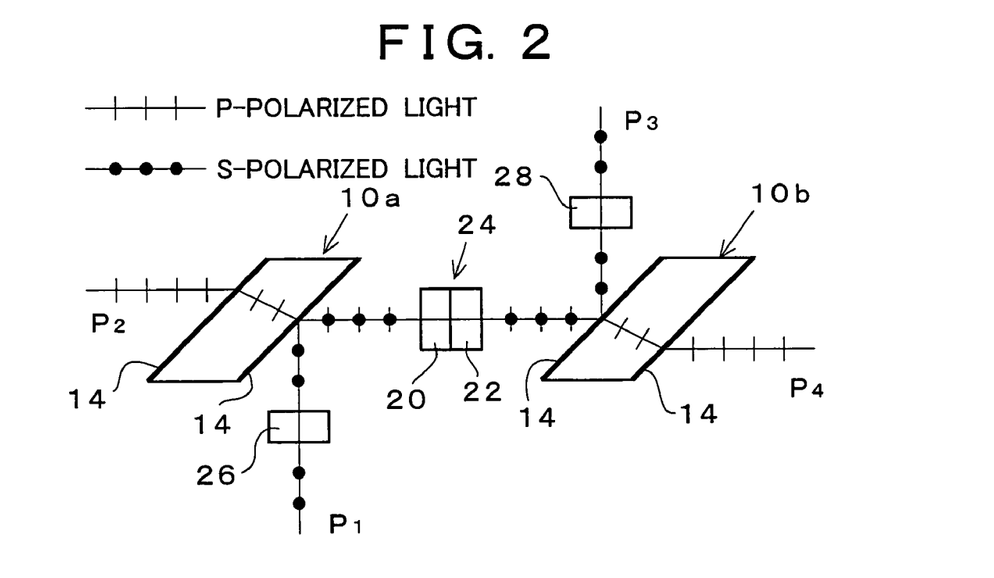
FIG. 2 is an explanatory view showing one embodiment of an optical circulator according to the invention.

FIG. 2 shows an explanatory view showing one embodiment of a 4-port optical circulator according to the invention. The structure is that, between two polarized-light separating/combining elements 10a, 10b having a structure explained related to FIGS. 1A–1C, is arranged an optical rotator 24 comprising a 45-degree Faraday element 20, a permanent magnet (not shown) for applying a magnetic field to the 45-degree Faraday element, and a ½-wavelength plate 22. The permanent magnet may be in a structure, for example, in an annular form inserting the Faraday element in its through-hole. When a first port $P_1$ to a fourth port $P_4$ are defined as in FIG. 2, polarizers 26, 28 for respectively blocking P-polarized light but transmitting S-polarized light are assembled at the first port $P_1$ and the third port $P_3$.

The S-polarized light, from the fist port $P_1$, passes the polarizer 26 and is reflected by a second surface (polarized-light separating/combining film) of the first polarized-light separating/combining element 10a, to be directed toward the optical rotator 24. In the optical rotator 24, combination is made such that the polarization plane is rotated 45 degrees by the Faraday element 20 and rotated reverse 45 degrees by the ½-wavelength plate 22. Consequently, the total polarization-plane rotation angle by the optical rotator 24 is 0 degrees and the S-polarized light remains as it is.

It is reflected on a first surface (polarized-light separating/combining film) of the second polarized-light separating/combining element 10b and passes the polarizer 28, to reach the third port $P_3$. The S-polarized light, from the third port $P_3$, passes the polarizer 28 and is reflected by a first surface (polarized-light separating/combining film) of the second polarized-light separating/combining element 10b, to be directed toward the optical rotator 24. The total polarization-plane rotation angle on the optical rotator 24 is 90 degrees, making a switching to P-polarized light. This transmits the second surface and first surface (polarized-light separating/combining film) of the first polarized-light separating/combining element 10a, to reach the second port $P_2$. From then on, similarly, the P-polarized light from the second port $P_2$ is coupled to the fourth port $P_4$ while the P-polarized light from the fourth port $P_4$ is coupled to the first port $P_1$, respectively. This realizes a 4-port optical circulator of first port $P_1 \rightarrow$ third port $P_3 \rightarrow$ second port $P_2 \rightarrow$ fourth port $P_4 \rightarrow$ first port $P_1$.

Herein, the output light (P-polarized light) to the second port $P_2$ passes both the second and first surfaces of the first polarized-light separating/combining element 10a, while the output light (P-polarized light) to the fourth port $P_4$ passes both the second and first surfaces of the second polarized-light separating/combining element 10b. Thus, the polarized-light separating/combining films are passed at two stages, having a high extinction ratio. Contrary to this, the output light (S-polarized light) to the first port $P_1$ is reflected by the second surface of the first polarized-light separating/combining element 10a, while the output light (S-polarized light) to the third port $P_3$ is reflected by the first surface of the second polarized-light separating/combining element 10b, whereby since the polarized-light separating/combining film is only reflected at one stage, the extinction ratio is low. Consequently, concerning the S-polarized light, the extinction ratio is raised by providing polarizers 26, 28 for blocking the P-polarized light.

Figure 3:
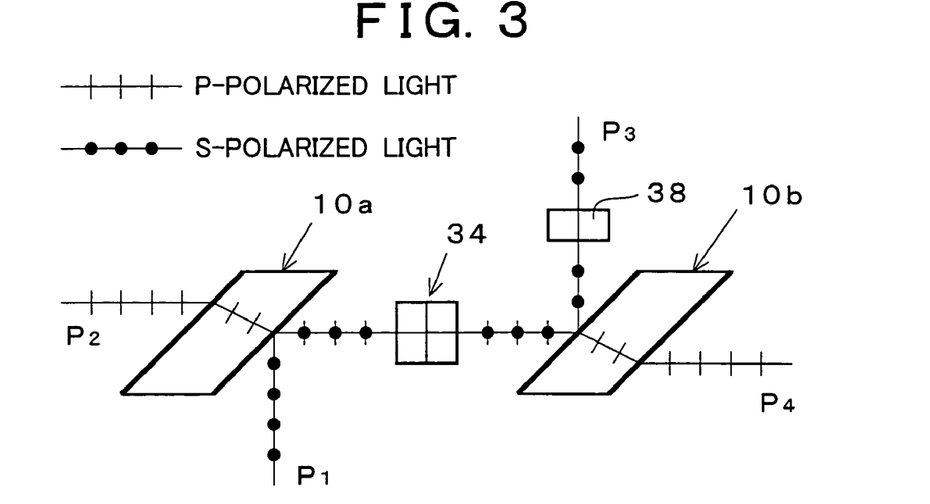
FIG. 3 is an explanatory view showing one embodiment of an optical switch according to the invention.

FIG. 3 is an explanatory view showing one embodiment of a 2×2 optical switch according to the invention. In front and back of a variable optical rotator 34 capable of switching the optical rotation angle to 0 degree and 90 degrees, are arranged polarized-light separating/combining elements 10a, 10b having the structure explained related to FIGS. 1A–1C. Herein, the variable optical rotator 34 comprises a Faraday element 30, an electromagnet (not shown) for applying a variable magnetic field to the Faraday element 30, and a ½-wavelength plate 32. The electromagnet may be, for example, an annular coil winding, in which the Faraday element 30 is accommodated. In the case that the polarization-plane rotation angle due to the Faraday element 30 is assumably switched to +45 degrees under a variable magnetic field of the electromagnet and the polarization-plane rotation angle due to the ½-wavelength plate 32 is taken +45 degrees, then the polarization-plane rotation angle on the variable optical rotator 34 is switched to 0 degrees and 90 degrees. When the first port $P_1$ to the fourth port $P_4$ are defined as in the figure, a polarizer 38 for blocking P-polarized light and transmitting S-polarized light is assembled on a side close to the third port $P_3$. Differently from the foregoing optical circulator case, there is no need to provide a polarizer on a side close to the first port $P_1$ because there is no return light to the first port $P_1$.

The operation of the optical switch is as follows. First, the poralization-plane rotation angle on the variable optical rotator 34 is rendered 0 degrees by a variable magnetic field due to the electromagnet. The S-polarized light from the first port $P_1$ is reflected by the second surface (polarized-light separating/combining film) of the first polarized-light separating/combining element 10a and is directed toward the variable optical rotator 34. On the variable optical rotator 34, because the polarization-plane rotation angle is 0 degree and the S-polarized light remains as it is, it is reflected by the first surface (polarized-light separating/combining film) of the second polarized-light separating/combining element 10b and passes the polarizer 38, to reach the third port $P_3$. The P-polarized light from the second port $P_2$ transmits the first and second surfaces (polarized-light separating/combining films) of the first polarized-light separating/combining element 10a and is directed toward the variable optical rotator 34. On the variable optical rotator 34, because the polarization-plane rotation angle is 0 degrees and the P-polarized light remains at it is, it transmits the first and second surfaces (polarized-light separating/combining film) of the second polarized-light separating/combining element 10b, to reach the fourth port $P_4$.

Next, the polarization-plane rotation angle on the variable optical rotator 34 is assumably switched to 90 degrees under a variable magnetic field due to the electromagnet. The S-polarized light from the first port $P_1$ reflects upon the second surface (polarized-light separating/combining film) of the first polarized-light separating/combining element 10a and is directed toward the variable optical rotator 34.

Because the variable optical rotator 34 rotates the polarization plane by 90 degrees, S-polarized light is changed to P-polarized light which passes the first and second surfaces (polarized-light separating/combining films) of the second polarized-light separating/combining element 10b and reaches the fourth port $P_4$. The P-polarized light from the second port $P_2$ transmits the first and second surfaces (polarized-light separating/combining films) of the first polarized-light separating/combining element 10a and is directed toward the variable optical rotator 34. Because the polarized-plane rotation angle is 90 degrees on the variable optical rotator 34, P-polarized light is changed to S-polarized light which is reflected by the first surface (polarized-light separating/combining film) of the second polarized-light separating/combining element 10b and transmits the polarizer 38, thus reaching the third port $P_3$.

Figure 4:
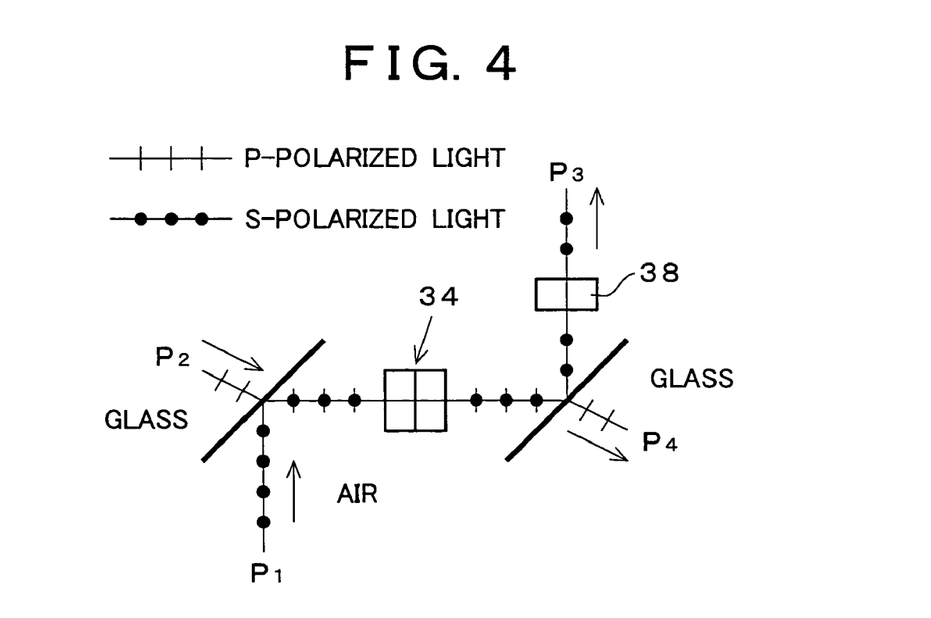
FIG. 4 is an optical-path explanatory view of the optical switch shown in FIG. 3.

In this manner, when the total rotation angle by the variable optical rotator 34 is 0 degrees, obtained is a state of first port $P_1 \rightarrow$ third port $P_3$ and second port $P_2 \rightarrow$ fourth port $P_4$ while, when the total rotation angle by the variable optical rotator 34 is 90 degrees, obtained is a state of first port $P_1 \rightarrow$ fourth port $P_4$ and second port $P_2 \rightarrow$ third port $P_3$. Consequently, magnetic field switching by the electromagnet provides operation as a cross-bar type 2×2 optical switch. The detail of the optical path is shown in FIG. 4.

By vertically and horizontally arranging the 2×2 optical switches thus structured in multi-stages, a matrix optical switch is realized. The basic units are 2-input, 2-output crossbar type switches, which are arranged in such a positional relationship that the front-staged output is in a rear-staged input position. Consequently, multi-stage arrangement is made such that the third port $P_3$ is a first port $P_1$ of a rear-staged switch unit and the fourth port $P_4$ is a second port $P_2$ of another rear-staged switch unit. With switch units in the number of M×N (M and N are integers of 2 or greater), it is possible to structure an M×N-matrix optical switch having M inputs and N outputs.

Figure 5:
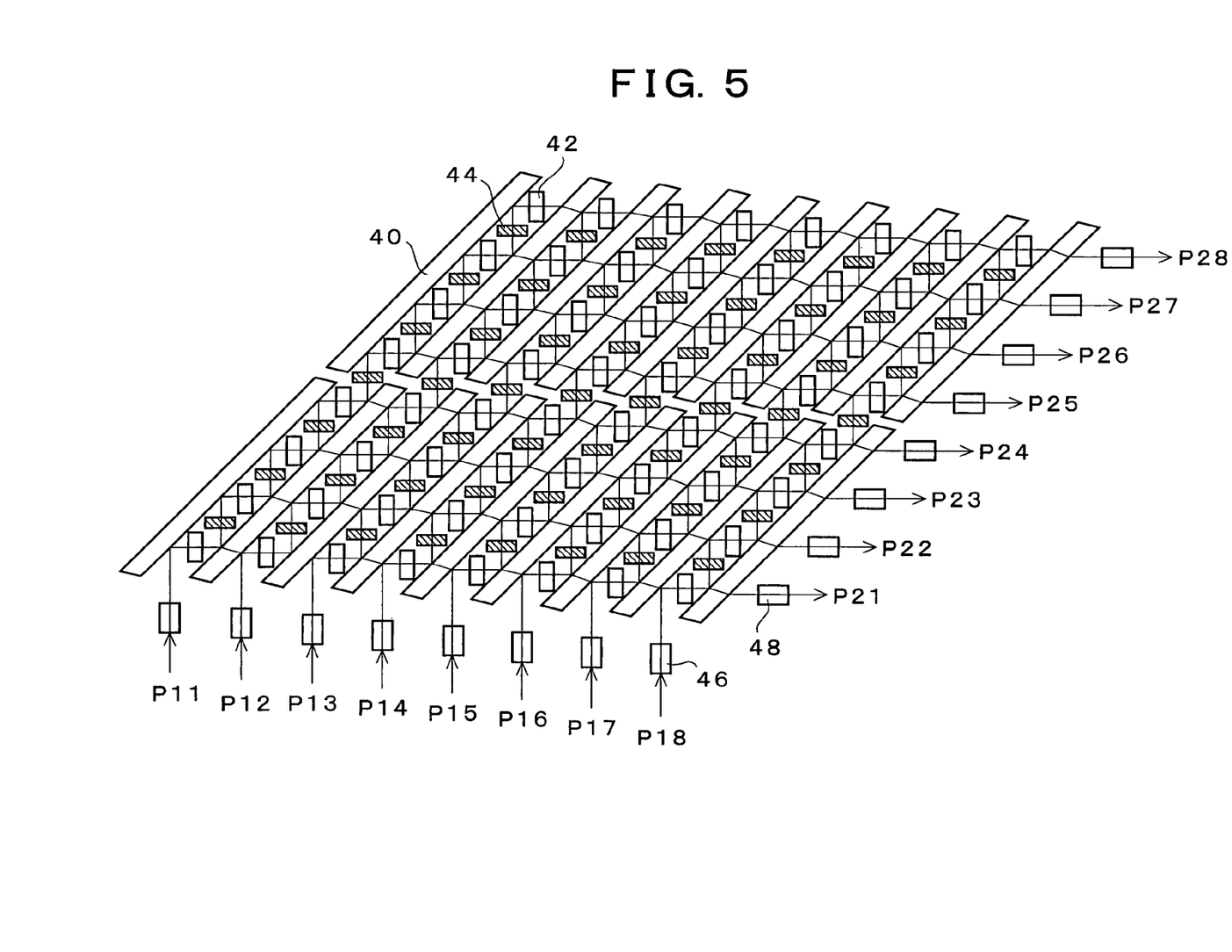
FIG. 5 is an explanatory view showing one embodiment of a matrix optical switch according to the invention.

In FIG. 5 is shown an embodiment of an 8-input 8-output matrix optical switch. This matrix optical switch is structured with polarized-light separating/combining elements 40, variable optical rotators 42, polarizers 44 for extinction ratio compensation, and polarization control sections 46, 48. The polarized-light separating/combining element 40 is structured by forming polarized-light separating/combining films (herein, dielectric multi-layer films) on opposite faces of a glass member in an elongate rectangular rod form (wherein at least one set of opposite faces are in a relationship of parallel plates). The optical switch main body is in a structure that polarized-light separating/combining elements 40 are arranged in two rows and nine columns, each four variable optical rotators 42 are arranged between adjacent columns, and polarizers 44 are arranged between adjacent variable optical rotators 42. The optical switch main body, at one side (herein, the lower side in the figure), is taken as an input side to provide input ports $P_{11}$–$P_{18}$ and, at one side in a rectangular direction thereto (herein, the right side in the figure), is taken as an output side to provide output ports $P_{21}$–$P_{28}$. S-polarized light enters at the input side of the optical switch main body (part structured by the polarized-light separating/combining elements 40, variable optical rotators 42, and the polarizers 44), while P-polarized light exits at the output side of the optical switch main body.

Figure 6A:
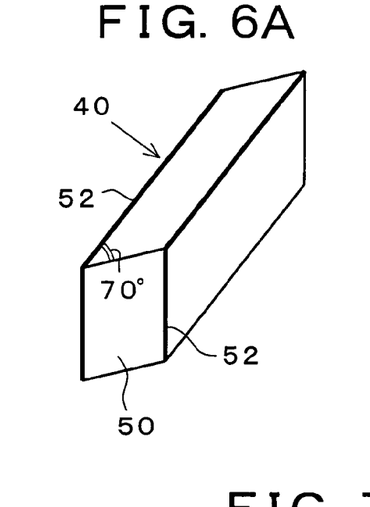
FIGS. 6A and 6B are explanatory views showing one example of a polarization separating/combining element for use in the matrix optical switch shown in FIG. 5.
Figure 6B:
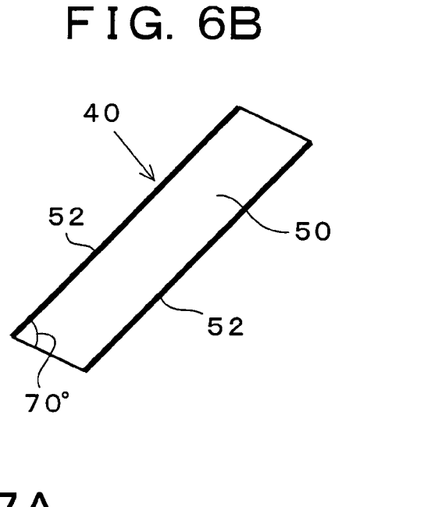

In this embodiment, the polarized-light separating/combining element 40 is fabricated with dielectric multi-layer films as polarized-light separating/combining films 52, designed for incidence in air on one side and glass on the other side and at 45 degrees, on the opposite faces of an elongate rod-formed glass having a rectangular form section, as shown in FIGS. 6A and 6B. The dielectric multi-layer film is similar to the usual PBS except that one side is an anti-air film. The orientation concerned with polarized-light separation/combining is coincident at opposite faces. Also, on the faces other than the faces on which the polarized-light separating/combining films have been made, anti-reflection films having a reflectivity of 0.1% are formed in order to expel the stray light within the glass member out of the glass member. In this manner, obtained are elongate polarized-light separating/combining elements 40 having two faces of polarized-light separating/combining films 52. Also, the cut angle at both ends of the glass member 50 is selected to be 70 degrees relative to the dielectric multi-layer surface such that the angle of ray of multi-reflection light is not coincident with a traveling direction of signal light. In the FIG. 5 embodiment, each polarized-light separating/combining element is in a structure integrating discrete polarized-light separating/combining elements corresponding to four switch units. The polarized-light separating/combining film 52 formed by a dielectric multi-layer film has an extinction characteristic of −60 dB or lower for a transmission component and −20 dB or lower for a reflection component. The transmission light has P-polarized light as a main component while the reflection light has S-polarized light as a main component.

The variable optical rotator 42, herein, is structured with a Faraday element, a lamination coil serving as an electromagnet for applying a variable magnetic field to the Faraday element, and a ½-wavelength plate made of crystal. The lamination coil is, for example, in an annular form (may be circular annular or polygonal annular), and made in a structure accommodating the Faraday element in a through-hole thereof. The use of lamination coil achieves size reduction. By switching the energizing current to the lamination coil, the application magnetic field to the Faraday element is varied to switch the polarization plane to ±45 degrees. This allows the total polarization angle to change on the variable optical rotator 42 to 0 degrees and 90 degrees.

Figure 7A:
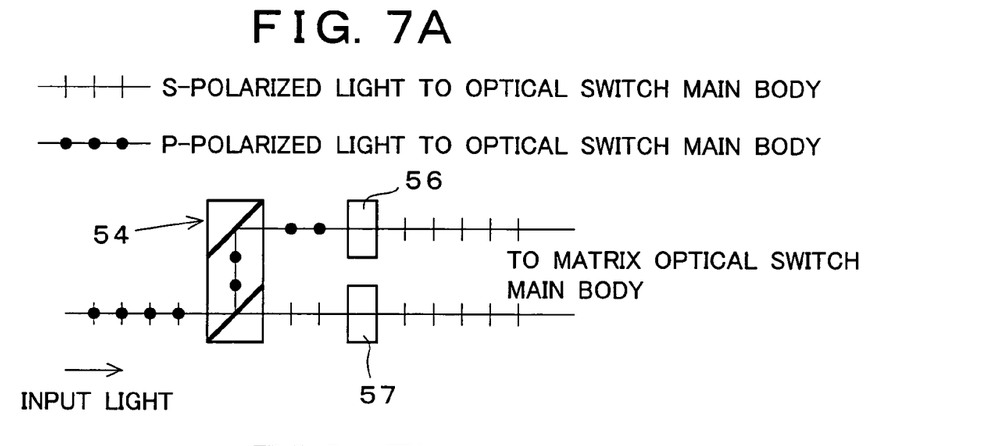
FIGS. 7A and 7B are explanatory views showing an example of a polarization control section.
Figure 7B:
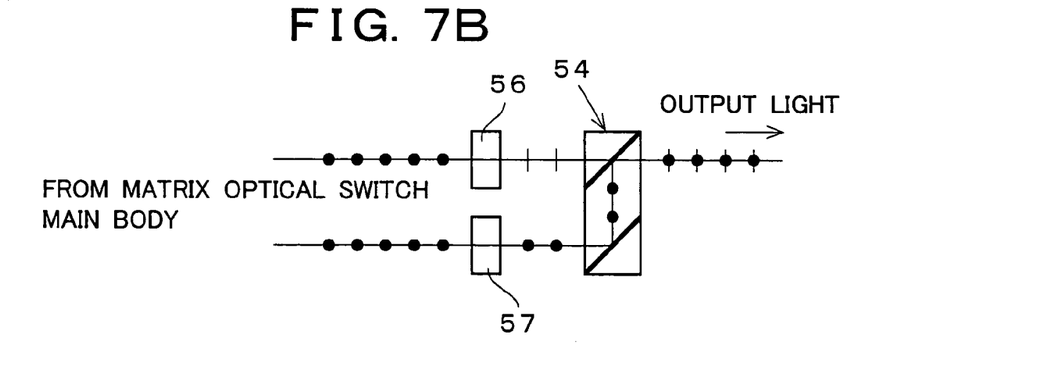

As noted above, S-polarized light enters at the input side of the optical switch main body while P-polarized light exits at the output side of the optical switch main body. The polarization control sections 46, 48 are for making free from polarization dependence, wherein the polarization control section 46 at the input side changes input light into S-polarized light while the polarization control section 48 at the output side synthesizes and outputs collimated P-polarized light. Examples of the polarization control sections 46, 48 are shown in FIGS. 7A and 7B. FIGS. 7A and 7B are views of the polarization control section 46, 48 as viewed from a side direction (in a direction parallel with the page). FIG. 7A shows the polarization control section 46 at the input side while FIG. 7B shows the polarization control section 48 at the output side. The examples, in any, are a combination of a PBS 54, a ½-wavelength plate 56 and a ½-wavelength plate 57. In order not to cause polarization-mode scatter, the relationship is inverted of a P-polarized light and an S-polarized light upon polarization separation and polarization synthesis, and furthermore the number of wavelength plates to pass through is matched to thereby equalize the optical path length of the two beams. For example, the optical axis of the ½-wavelength plate 56 may be placed at 45 degrees with respect to the horizontal direction, while the optical axis of the ½-wavelength plate 57 may be at 0 or 90 degrees with respect to the horizontal direction. The ½-wavelength plate 57 is a dummy (not to change polarization direction even if passed) playing a role to match the optical path length. The provision of such a polarization control section makes it possible to structure a matrix optical switch free of polarization dependence.

In the matrix optical switch, the optical signal leak due to multi-stage arrangement is problematic. The optical signal leak to a not intended port is called crosstalk. It is ideal to suppress this to approximately −45 dB with respect to signal light intensity. Generally, the optical switch using PBS is not sufficient in respect of crosstalk, the present structure solves this problem by multi-stage arrangement and using polarizers. In the invention, there are four kinds of crosstalk components, which will be explained below. Roughly speaking, the P-polarized light to reflect upon the dielectric multi-layer film (polarized-light separating/combining film) is at approximately −20 dB and the S-polarized light to transmit the dielectric multi-layer film is at approximately −30 dB.

Figure 8:
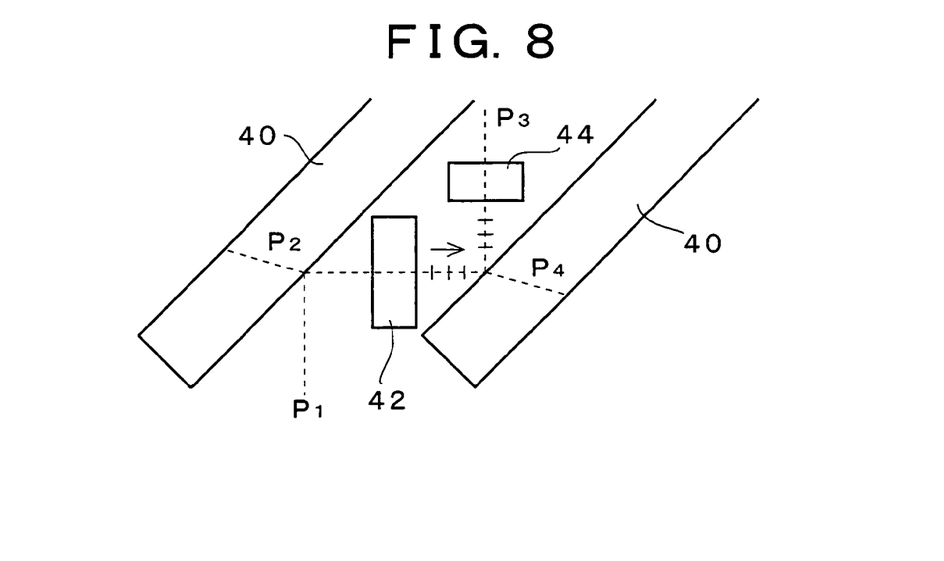
FIG. 8 is an explanatory view of the P-polarized light that is to unsuccessfully reflect to a third port $P_3$.

(1) P-Polarized Light Resulting in Reflection Toward Third Port $P_3$ (see FIG. 8)

Although S-polarized light is a normal light to the third port $P_3$, P-polarized light as a signal to go to fourth port $P_4$, in part, reflects upon the dielectric multi-layer film and travels toward the third port $P_3$. Because this has an intensity ratio of approximately −20 dB, the P-polarized light component is cut by an absorption-type polarizer 44 arranged in a post-reflection position, in an orientation to absorb the P-polarized light. Also, should the polarizer 44 have an extinction ratio of approximately −40 dB (in other words, should there be a P-polarized light of approximately −40 dB), there is less of a problem because most of P-polarized light transmits a polarized-light separating/combining element as a first dielectric multi-layer film of the succeeding unit and a reflected P-polarized light component further undergoes −20 dB attenuation. Incidentally, although the transmitted P-polarized light component also transmits the next surface of the polarized-light separating/combining element, this is not problematic because of beam positional deviation described later.

Figure 9:
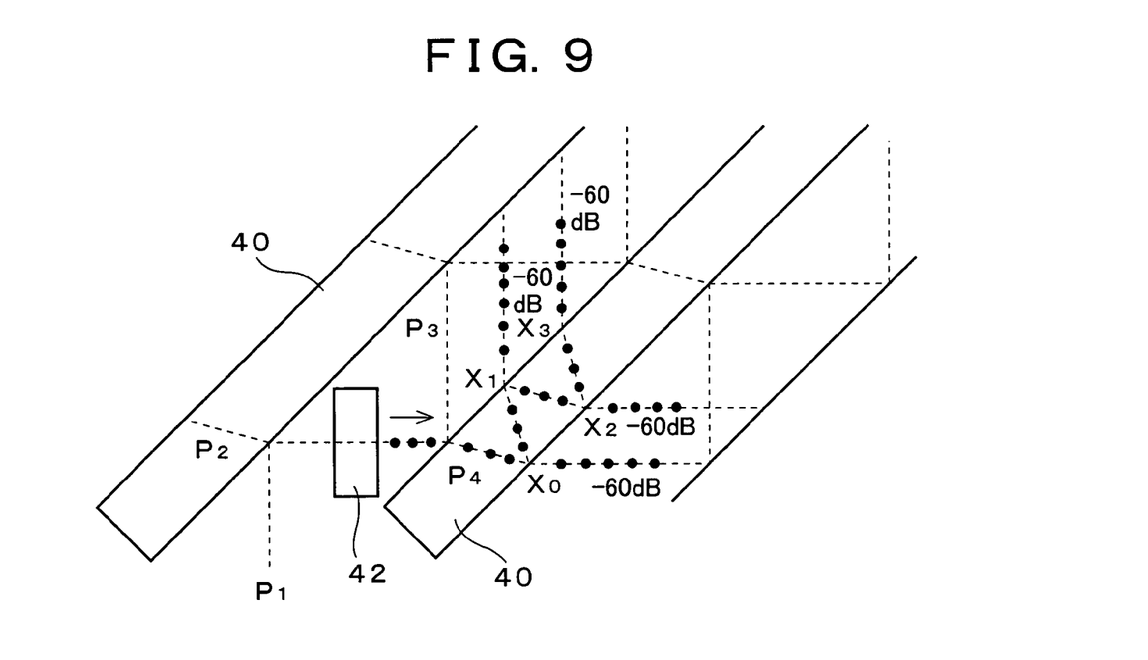
FIG. 9 is an explanatory view of the S-polarized light that is to unsuccessfully transmit to a fourth port $P_4$.

(2) S-Polarized Light Resulting in Transmission to Fourth Port $P_4$ (see FIG. 9)

Although P-polarized light is a normal signal to the fourth port $P_4$, the S-polarized light −30 dB, of the S-polarized light to go to the third port $P_3$, transmits the dielectric multi-layer film. Because this S-polarized light further undergoes −30 dB attenuation and transmits by a point $X_0$ on the first dielectric multi-layer film of the succeeding unit, the component leaking to the first port $P_1$ of the succeeding unit becomes −60 dB by the two dielectric multi-layer films, thus causing less of a problem. However, the S-polarized light, because of reflective polarized light, reflects in its most part resulting in multi-reflection at an intensity ratio of −30 dB within the polarized-light separating/combining element. However, when the S-polarized light again comes out of the polarized-light separating/combining element, it further undergoes attenuation by −30 dB. Consequently, this component is almost not problematic.

Figure 10:
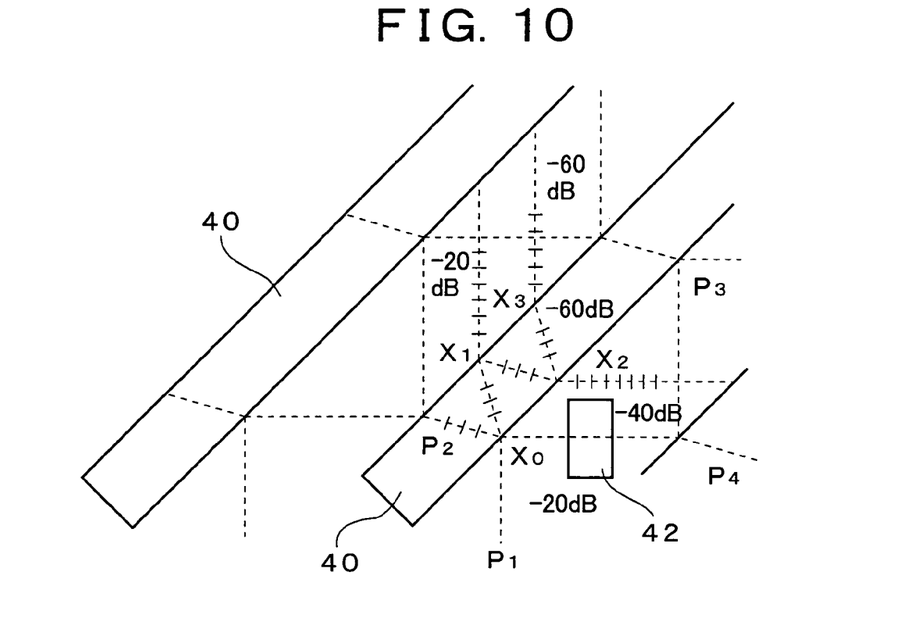
FIG. 10 is an explanatory view of a leakage of P-polarized light that is to enter a second port $P_2$.

(3) Leak of P-Polarized Light to be Outputted to Second Port $P_2$ (see FIG. 10)

The P-polarized light entering the second port $P_2$, although partly reflects at a point $X_0$, is in an intensity ratio of −20 dB. This multi-reflects within the polarized-light separating/combining element. Provided that the reflection points are $X_1, X_2, \ldots$, it reflects while undergoing −20 dB attenuation upon each reflection to transmit with almost that intensity from Xn. Namely, at $X_1$, $X_2$ and $X_3$, P-polarized light transmission takes place at an intensity ratio of −20 dB, −40 dB and −60 dB, respectively. Consequently, the multi-reflected light of $X_3$ or the subsequent is almost not problematic. Although the transmission light from the $X_1$, $X_2$ is great in intensity ratio wherein this light problematically enters a normal signal route, there is no problem if the transmission position is greatly deviated from the normal route. The position $X_1$, $X_2$ is determined by a plate thickness of the polarized-light separating/combining element, a material refractive index and a signal-light incident angle while the normal signal route is determined by a distance between polarized-light separating/combining elements and a signal incident angle. These two can be determined independently. In the case the geometrical relative position is considered to make a design not to couple leak light to a normal signal route, the leak light does not cause a problem.

In the present embodiment, in the case of selecting, for example, a glass having a thickness of 2 mm and a refractive index of 1.46, to provide a distance between polarized-light separating/combining elements of 5 mm and a signal-light incident angle relative to the dielectric multi-layer film of 45 degrees, then the above problem can be solved. For example, the transmission P-polarized beam from $X_1$ is outputted to a position shifted by approximately 1.5 mm with respect to the normal signal, obtaining a sufficient leak-light blocking characteristic not affecting the normal signal light (low stroke characteristic).

Figure 11:
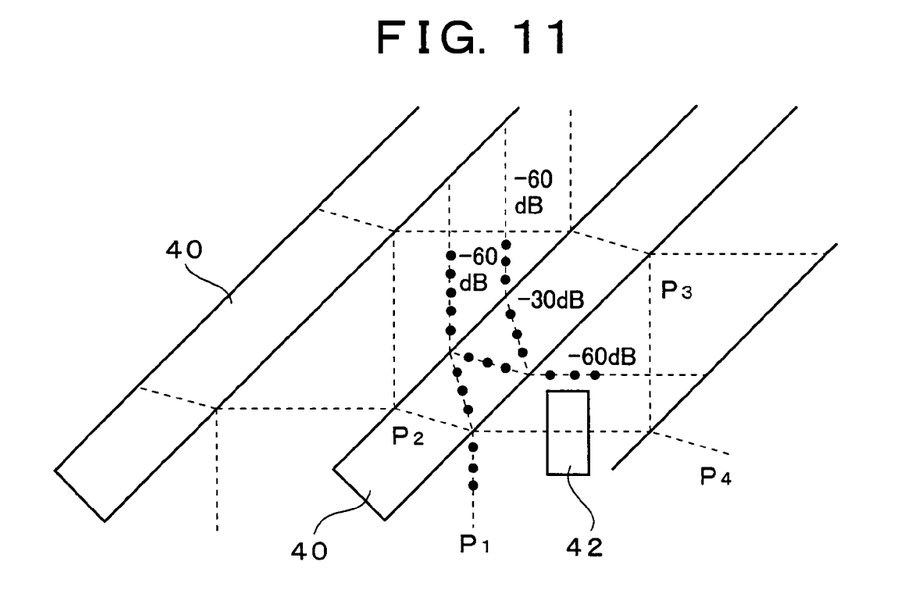
FIG. 11 is an explanatory view of a leakage of S-polarized light that is to enter a first port $P_1$.

(4) Leak of S-Polarized Light to be Inputted to First Port $P_1$ (see FIG. 11)

This is nearly the same as the above (2) and is not a problem.

In the present embodiment, the polarized-light separating/combining element uses, as polarized-light separating/combining films, dielectric multi-layer films. However, the polarized-light separating/combining film may use a polarized-light separating/combining film made by a photonic crystal. In the case of a photonic crystal, because of its high extinction ratio (polarization separatability), the foregoing leakage of light is less. Sufficiently low crosstalk is to be expected in the absence of absorption-type polarizers 44 as mentioned in the above (1). Namely, in the case a two-face photonic crystal is used as a polarized-light separating/combining element in the FIG. 5 embodiment, it is possible to omit the polarizer close to the third port $P_3$. Also, in the FIG. 2 circulator and FIG. 3 optical switch, the polarizer can be omitted if using two one-face photonic crystal in place of the two two-face PBSs.

Figure 12:
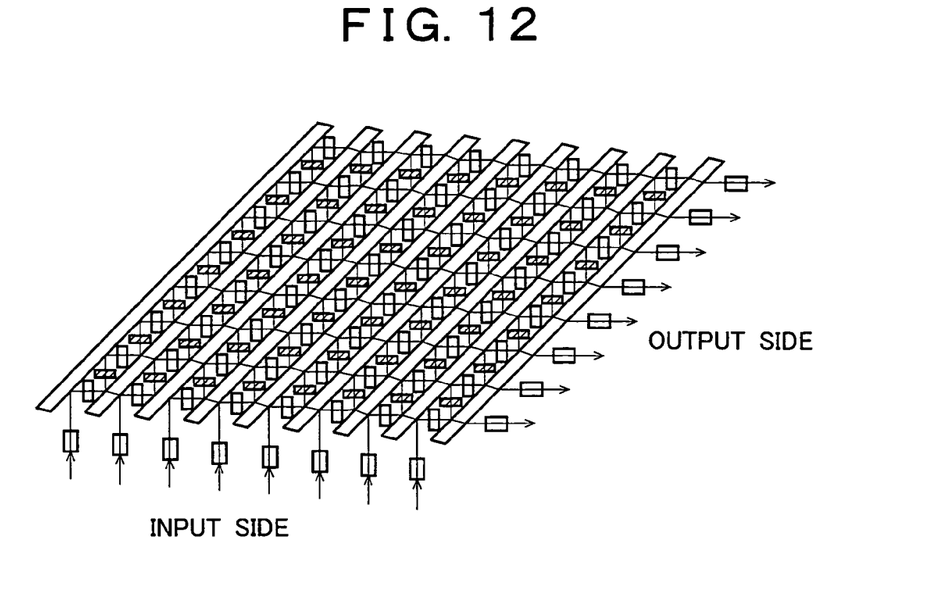
FIG. 12 is an explanatory view showing another embodiment of a matrix optical switch according to the invention.
Figure 13:
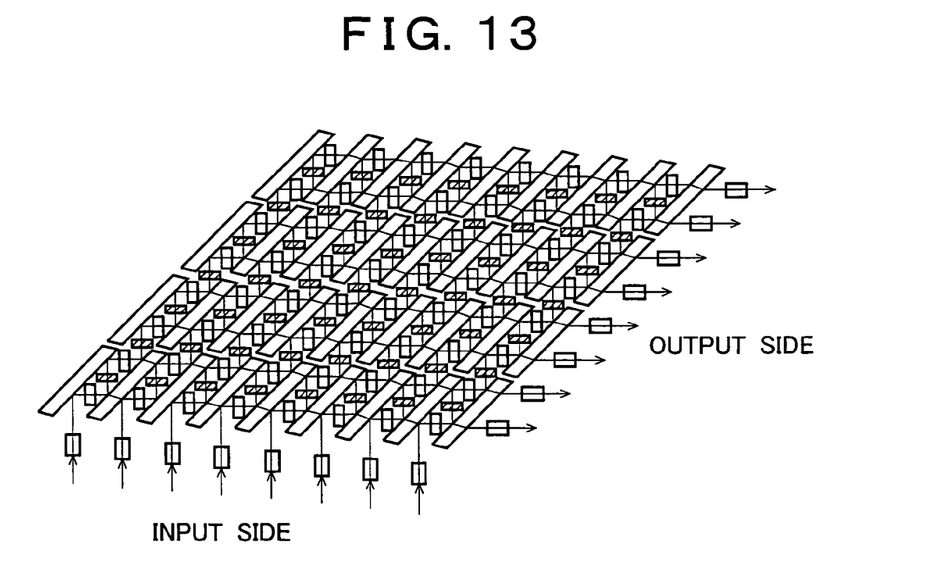
FIG. 13 is an explanatory view showing still another embodiment of a matrix optical switch according to the invention.

By adjusting the position of switch units, it is possible to use a polarized-light separating/combining element previously integrated on a plurality of optical paths. As in the foregoing, the present embodiment previously fabricates polarized-light separating/combining elements corresponding to four units and uses these, thereby making it possible to omit the labor and time of alignment. A non-blocking 8×8-type matrix optical switch was obtained which had an insertion loss of 8 dB and a crosstalk of −45 dB or less. Of course, it is possible to use integrated polarized-light separating/combining elements corresponding to 8 units as shown in FIG. 12 or integrated polarized-light separating/combining elements corresponding to two units as shown in FIG. 13.

The present invention is a polarized-light separating/combining element having polarized-light separating/combining films respectively formed on both surfaces of a transparent member having flat surfaces parallel with each other, wherein both polarized-light separating/combining films face to air. Accordingly, because there are no bonding structures, it is possible to suppress a deviation in a ray direction (angular error) to a possible low extent, reduce beam coupling loss and improve extinction ratio.

The present invention enables a small, low loss optical device (optical circulator or optical switch) to be inexpensively and easily assembled by using polarized-light separating/combining elements as above. Furthermore, the present invention enables a magneto-optical type matrix optical switch to be inexpensively and easily assembled which is small and exhibits a low crosstalk characteristic.

What is claimed is:

1. A matrix optical switch comprising:
   2x2 optical switches vertically and horizontally arranged in multiple stages,
   wherein each of the optical switches is arranged with polarized-light separating/combining elements in front and rear of a variable optical rotator capable of switching an optical rotation angle to 0 degrees and 90 degrees,
   wherein each of the polarized-light separating/combining elements includes a transparent member having flat surfaces parallel with each other,
   wherein, for each of the polarized-light separating/combining elements, polarized-light separating/combining films are respectively formed on the parallel flat surfaces of the transparent member, and
   wherein the polarized-light separating/combining films are faced to air.

2. A matrix optical switch according to claim 1,
   wherein each of the polarized-light separating/combining films has a broad area which allows for a plurality of collimated light beams to enter, and
   wherein a plurality of variable optical rotators capable of switching an optical rotation angle to 0 degrees and 90 degrees are arranged on respective optical paths of the collimated light beams between adjacent ones of the polarized-light separating/combining elements.

3. A matrix optical switch according to claim 1, wherein each of the polarized-light separating/combining elements share a common surface of a photonic crystal.

4. A matrix optical switch according to claim 1, wherein, in each of the polarized-light separating/combining elements, an absorption-type polarizer is arranged in a post-reflection position in an orientation to absorb a leak light component.

5. A matrix optical switch according to claim 1, wherein an input array of the 2x2 optical switches and an output array of the 2x2 optical switches are located on a same plane.

* * * * *